(12) United States Patent
Andreasen et al.

(10) Patent No.: US 9,115,538 B2
(45) Date of Patent: Aug. 25, 2015

(54) SCREENING DEVICE WITH AN ELECTRONIC MOTION SENSOR

(75) Inventors: Ravndal Bjarne Andreasen, Struer (DK); Martin Armand Mortensen, Skjern (DK); Ulrik Ulriksen, Skjern (DK)

(73) Assignee: VKR HOLDING A/S (DK)

( * ) Notice: Subject to any disclaimer, the term of this patent is extended or adjusted under 35 U.S.C. 154(b) by 1144 days.

(21) Appl. No.: 12/663,389

(22) PCT Filed: Jun. 7, 2007

(86) PCT No.: PCT/DK2007/000274
§ 371 (c)(1),
(2), (4) Date: Nov. 8, 2010

(87) PCT Pub. No.: WO2008/148386
PCT Pub. Date: Dec. 11, 2008

(65) Prior Publication Data
US 2011/0048655 A1  Mar. 3, 2011

(51) Int. Cl.
*E06B 9/72* (2006.01)
*H02K 7/14* (2006.01)
*H02K 11/00* (2006.01)

(52) U.S. Cl.
CPC ... *E06B 9/72* (2013.01); *H02K 7/14* (2013.01); *H02K 11/0015* (2013.01); *H02K 11/0073* (2013.01); *H02K 2207/03* (2013.01)

(58) Field of Classification Search
CPC .......................................................... E06B 9/72
USPC ............ 160/310, 3, 4, 8; 49/28; 318/282, 286
See application file for complete search history.

(56) References Cited

U.S. PATENT DOCUMENTS 1,633,825 A * 6/1927 Prescott ........................ 318/261
6,116,320 A * 9/2000 Peterson .................... 160/84.02
(Continued)

FOREIGN PATENT DOCUMENTS

DE  19706209 A1  5/1998
DE  20000682 U1  5/2000
(Continued)

OTHER PUBLICATIONS

International Search Report PCT/DK2007/000274; Dated Feb. 26, 2008.
(Continued)

*Primary Examiner* — Blair M Johnson
(74) *Attorney, Agent, or Firm* — Cantor Colburn LLP (57) ABSTRACT

The screening device comprises a tubular element with an axis of rotation and rotatable in relation to a shaft device. It further comprises a screening body with one end secured to said tubular element and a free opposite end, which on rotation of said tubular element is adapted to move between a first position, in which the screening body is completely rolled up on said tubular element, and a second position, in which the screening body extends over said aperture in order to screen it. A drive unit for driving said tubular element comprises a motor connected to said tubular element and said shaft device such as to provide said rotation of said tubular element in relation to said shaft device. A control unit controls operation of said motor and comprises a printed circuit board with an electronic motion sensor. Said printed circuit board is located in a fixed position in relation to said axis of rotation of said tubular element and/or in relation to said shaft device.

16 Claims, 4 Drawing Sheets

(56) References Cited

U.S. PATENT DOCUMENTS

| | | | |
|---|---|---|---|
| 6,215,265 B1 * | 4/2001 | Wolfer et al. | 318/434 |
| 6,680,594 B2 * | 1/2004 | Collett et al. | 318/280 |
| 6,997,301 B1 * | 2/2006 | Seeley et al. | 192/116.5 |
| 7,129,657 B2 * | 10/2006 | Cavarec et al. | 318/280 |
| 7,726,379 B2 * | 6/2010 | Beau | 160/310 |
| 2005/0001737 A1 * | 1/2005 | Baron et al. | 340/854.4 |
| 2011/0045655 A1 * | 2/2011 | Yamazaki | 438/458 |

FOREIGN PATENT DOCUMENTS

| | | |
|---|---|---|
| DE | 202004012150 U1 | 11/2004 |
| DE | 202006013201 U1 | 11/2006 |
| EP | 0822316 A2 | 2/1998 |
| EP | 1659256 A2 | 5/2006 |
| WO | 2004015235 A1 | 2/2004 |

OTHER PUBLICATIONS

International Report on Patentability; International Application No. PCT/DK2007/000274; International Application Filing Date Jun. 7, 2007; Completion Date Aug. 21, 2009.

Written Opinion, International Application No. PCT/DK2007/000274; International Application Filing Date Jun. 7, 2007; Mail date Feb. 26, 2008.

* cited by examiner

SCREENING DEVICE WITH AN ELECTRONIC MOTION SENSOR

The present invention relates to a screening device for screening an aperture, such as a window, said screening device comprising a tubular element with an axis of rotation and rotatable in relation to a shaft device, a screening body with one end secured to said tubular element and a free opposite end, which on rotation of said tubular element is adapted to move between a first position, in which the screening body is completely rolled up on said tubular element, and a second position, in which the screening body extends over said aperture in order to screen it, and a drive unit comprising a motor connected to said tubular element and said shaft device such as to provide said rotation of said tubular element in relation to said shaft device, and a control unit controlling operation of said motor.

Such a screening device is known from DE 19706209. This screening device comprises a coupling element or mounting part located at one end of the tubular element, i.e. at the end of the shaft device and positioned within the tubular element. The shaft device comprises the motor, which is also positioned within the tubular element. By means of a rod of the mounting part the shaft device is connected to the remaining part of the screening device, which is secured on the window or on a building part in arrangement with the window. The rod is connected to a spring such as to make it pivotable or rotatable in relation to the remaining part of the screening device. The shaft device including the motor is thus adapted to pivot or rotate some degrees)(10-60°) between two rod abutments in relation to the remaining part of the screening device when the torque of the motor in relation to the tubular element varies. When the screening body is lowered and reaches the second position or an obstacle, the weight of the screening body and bottom bar is reduced, and the shaft device rotates or pivots to another position. In one position the rod touches a switch, in the other it does not. Thereby, a control unit of the screening device connected to the switch is able to detect if the free end of the screening body has reached the second position or an obstacle. The motor may then be stopped, thereby preventing that the screening body is lowered further. A like function may be available when moving the screening device from the second position to the first position, i.e. when rolling up the screening body on the tubular element.

DE 19706209 proposes the use of a microswitch for detecting the position of the rod. In the prior art alternatives such as strain gauges and optical rotary encoders have also been proposed.

From EP1659256 it is known to position an accelerometer or a vibration sensor at the free end of the screening body, i.e. in a bottom bar or the like. With an effect similar to the screening device of DE 19706209 the accelerometer or vibration sensor is thus able to detect when the screening body has reached the second position or an obstacle.

In all the described prior art screening devices it is necessary to install wiring between the detecting device and the control unit. This makes it difficult and time-consuming to construct the screening device. Most often not much room is available between the respective parts within the tubular element, especially since it is an important object to keep the overall size of the screening device as small as possible. It is thus difficult to guide wires from the control unit to the end of the screening device and even more laborious to guide wires to the free end of the screening body. Practically, manual guiding of wires is the only possible solution.

It is the object of the present invention to provide a screening device of the above-mentioned type, which is easier and cheaper to produce, and which is more durable.

To meet this object the screening device is characterized in that said control unit comprises a printed circuit board with an electronic motion sensor, said printed circuit board being located in a fixed position in relation to said axis of rotation of said tubular element and/or in relation to said shaft device.

In the screening device according to the present invention a printed circuit board and thereby an electronic motion sensor is located in a fixed position in relation to either one or both of the axis of rotation of the tubular element and the shaft device of the screening device, which are affected when the path of the screening body covering the window is blocked when the free end of the screening device reaches the end of the window or an obstacle.

If the motion sensor is fixed in relation to the shaft device, the sensor is able to detect motion of the shaft device. If the shaft device is further adapted to move or rotate between two positions in relation to the remaining part of the screening device when the torque of the motor in relation to the tubular element varies, the motion sensor is able to detect when the free end of the screening body reaches its second position or an obstacle blocking its path. It may also be adapted to detect when the screening body reaches its first position. For this purpose the shaft device may e.g. be connected to a coupling device corresponding to the coupling device explained above in relation to DE 19706209.

If the motion sensor is in a fixed position in relation to the axis of rotation of the tubular element, the control device is able to detect translational motion of the tubular element in the moving direction of the screening body. If the tubular member, and thus the motion sensor, for example are further resiliently secured to the window such as to be able to move resiliently in the moving direction of the screening body, the tubular member will move in the upwards direction when the free end of the screening body reaches its second position or an obstacle blocking its path. The motion sensor in a fixed position in relation to the axis of rotation of the tubular element detects the motion, and the control device may react on an input from the motion sensor to stop lowering of the free end of the screening device. Similarly, when the screening body is rolled up on the tubular member, the motion sensor will detect motion and may stop movement of the screening body when the free end reaches the first position, i.e. the screening body is rolled up on the tubular member. Also, the motion sensor may detect when a large thrust of wind affects the screening body, the screening body being retracted to prevent damage.

In both cases detection of motion and thus control of the motion of the screening body is achieved without having to carry out the difficult and time-consuming, manual act of guiding wires from the control unit to the end of the screening device or to the free end of the screening body. With the screening device according to the present invention manufacture of the device may entirely be carried out by means of automatic assembly. The electronic motion sensor forms part of the printed circuit board and may thus be mounted directly on the board on the machine mounting any other components on the board. A standard large quantity produced electronic motion sensor, such as a MEMS (MicroElectroMechanical Systems) sensor, may furthermore be applied, making manufacture of the screening device cheaper and simpler than any prior art screening device.

Furthermore, the screening device according to the present invention is more durable because wiring between movable parts, i.e. between control unit and the end of the tubular member or the free end of the screening body, is avoided. If the motion sensor on the printed circuit board is damaged, simply replacing the printed circuit board may repair the screening device. Repairs are thus more readily carried out.

In a preferred embodiment of the screening device according to the invention said drive unit is positioned within said tubular element.

It is preferred that said drive unit forms part of said shaft device. Hereby, the drive unit follows the movement of the shaft device, e.g. if the shaft device is positioned to be rotatable.

In another preferred embodiment said motion sensor is in the form of an accelerometer or a gyro sensor, preferably a MEMS sensor. Hereby, a reliable and cheap electronic sensor, which is able to detect also a direction of motion and in some cases even its static position, is achieved. This is of great advantage regarding control of the screening device.

In another preferred embodiment said drive unit is adapted to perform an automatic or semi-automatic movement of said free end of said screening body between said first and second positions when said motion sensor detects a predefined motion pattern.

In another preferred embodiment said screening device further comprises a mounting part adapted to be secured to said window or a building part in arrangement with said window in a fixed position in relation to said window. In a further development said shaft device is adapted to perform a limited tilting movement, preferably between 3-30°, more preferably about 8°, between at least two end points in relation to said mounting part and thus, in use, in relation to said window, said electronic motion sensor in all positions of said free end of said screening body being located in a fixed position in relation to said shaft device. In yet a further development of this embodiment said shaft device is resiliently secured to said mounting part. This is preferably achieved by means of a spring device inserted between said shaft device and said mounting part such as to provide a spring force between them and thus said resiliency, said spring force acting in a direction opposite to a direction of rotation of said tubular element when moving said free end of said screening body from said first to said second position, preferably a characteristic of said spring device is adjustable.

In another embodiment said screening device is mounted on said window, said free end of said screening body being adapted to move from said first to said second position substantially parallel to a plane of a pane of said window.

The invention will be explained in detail in the following by means of examples of embodiments with reference to the drawings, in which

Figure 1:
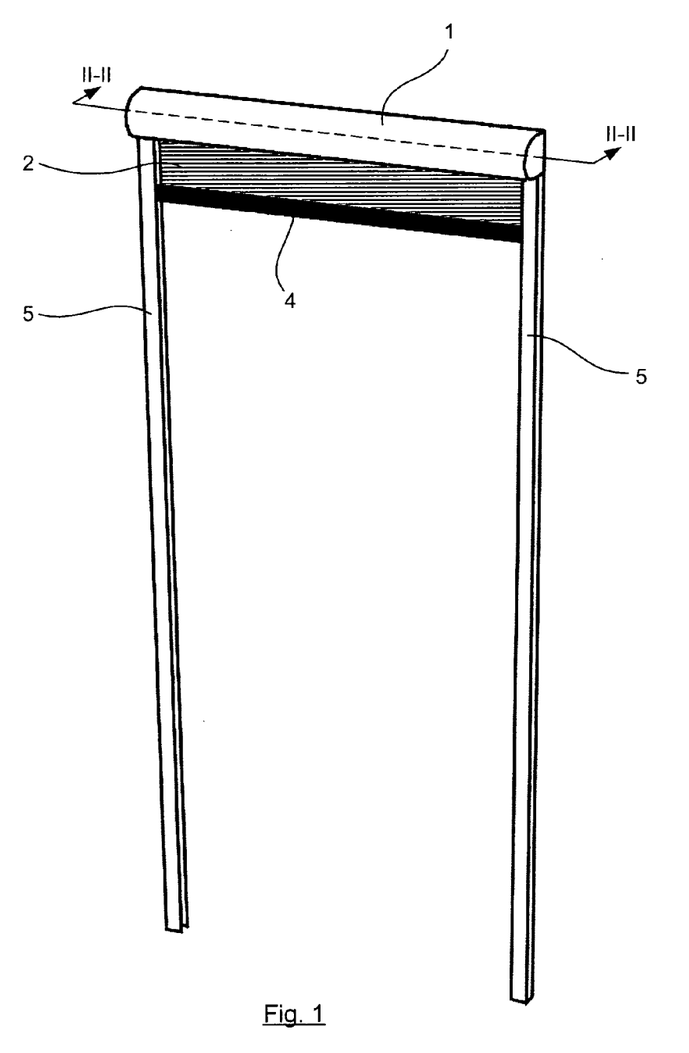
FIG. 1 is a perspective view of an embodiment of a screening device according to the invention.

FIG. 1 shows an embodiment of a screening device according to the present invention, the screening device of this embodiment taking the form of an awning blind to be mounted on a window (not shown).

The awning blind comprises a housing 1 adapted to take up a screening body in the form of an awning cloth 2. The awning blind is suitable for screening a windowpane of the window, the housing 1 being adapted to be secured to said window, e.g. to a window frame or window sash, or a building part in arrangement with said window. The awning blind is adapted to move the awning cloth substantially parallel to a plane of the pane of said window.

One end of the awning blind is secured to a hollow tubular element 3 (cf. below), a free, opposite end of the awning cloth 2 taking the form of a bottom bar 4. On rotation of the tubular element 3 the bottom bar 4 is movable between a first position, in which the awning cloth 2 is completely rolled up on said tubular element 3, and a second position, in which the awning cloth 2 extends over the window in order to screen it. In the first position the bottom bar 4 abuts the housing 1; in the second position it abuts a bottom part of the window, such as a sash of the window. In FIG. 1 the bottom bar 4 of the awning cloth 2 has been drawn a small distance from the first position towards the second position. The bottom bar 4 is guided in guide rails 5 positioned on each side of the window or a building part in arrangement with said window.

Figure 2:
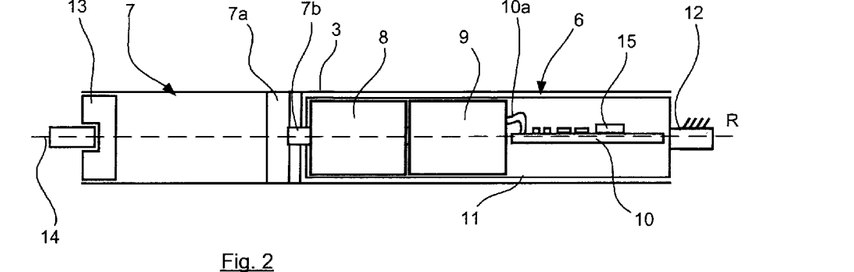
FIG. 2 is a schematic cross sectional view though a tubular element of the screening device taken along the line II-II of FIG. 1.

FIG. 2 is a schematic cross sectional view through the tubular element 3 of the awning blind of FIG. 1 along the line II-II of FIG. 1. The tubular element 3 has an axis of rotation R and is rotatable in relation to a shaft device 6. In the present embodiment the shaft device 6 comprises a drive unit, the drive unit comprising a rotor 7, a gearing 8 and an electromotor 9, and a control unit in the form of a printed circuit board 10. The printed circuit board 10 is thus located in a fixed position in relation to the axis of rotation R of the tubular element 3 and in a fixed relation to the shaft device 6. In a variant of the present embodiment of a screening device the shaft device may be somewhat movable in relation to the axis of rotation of the tubular element, the control device thus being fixed in relation to the shaft device, but not in relation to the axis of rotation R since it is rotatable about the latter.

The gearing 8 and electromotor 9 are housed in a shaft housing 11 of the shaft device 6, the rotor 7 projecting from one end of the shaft housing 11. The shaft device 6 is furthermore connected to a first mounting part 12, which projects from the opposite end of the shaft housing 11. The design of the mounting part 12 is drawn very schematically in FIG. 2 and will be explained in more detail below. At its opposite end the tubular element 3 is fixed to an end member 13 mounted rotatably on a second mounting part 14, which forms part of the housing 1 fixed to the window or a building part in arrangement with the window.

The rotor 7 comprises a first part 7a secured to an inner wall of the tubular element 3 and a second part 7b connecting the first part 7a to the gearing 8. Via gearing 8 the motor 9 is able to rotate the rotor 7 and thereby the tubular element 3 in relation to the shaft device 6 on activation by means of the printed circuit board 10 connected to the motor 9 by means of wiring 10a.

The gearing 8 may comprise any conventional gearing means known to the skilled person, such as gears, such as to provide a suitable transmission to the rotary movement of the tubular element 3.

The printed circuit board 10 comprises an electronic motion sensor 15 mounted on the printed circuit board 10 together with other suitable control components. The electronic motion sensor 15 forming part of the shaft device 6 is thus fixed in relation to the shaft device 6 and follows movement of the latter. In the present embodiment the motion sensor 15 is in the form of an accelerometer or a gyro sensor, preferably a MEMS sensor. The motion sensor may alternatively be a piezo type device or any other suitable electronic component. A MEMS sensor is a very cheap, small component, which may easily be mounted on the printed circuit board during manufacture of this.

Figures 3, 4:
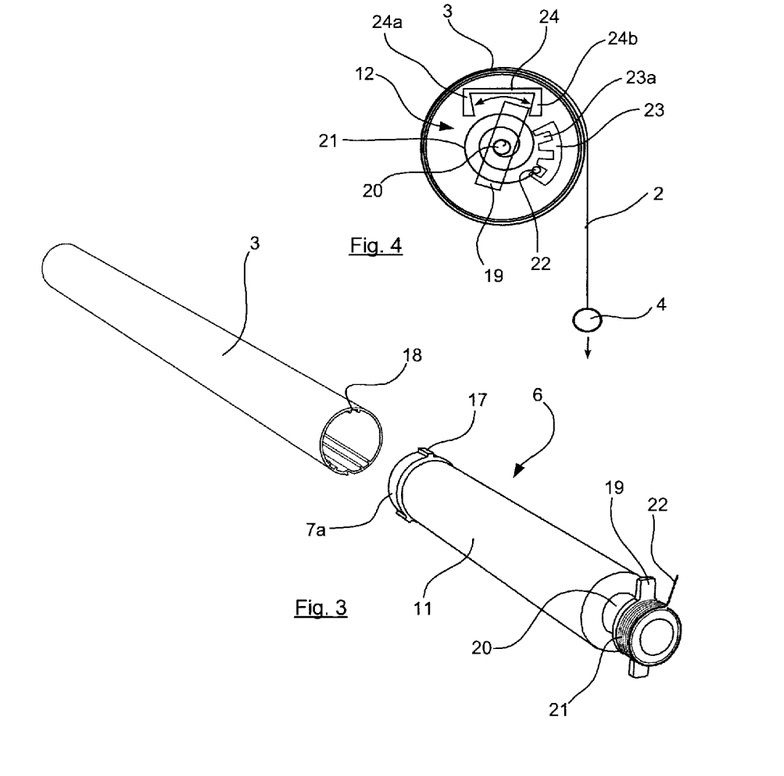
FIG. 3 is a perspective view of the tubular element and a shaft device of the screening device of FIG. 1.
FIG. 4 is a schematic view seen from the end of a tubular element of the screening device of FIG. 1.

FIG. 3 is a more detailed, exploded view of the tubular element 3 and shaft device 6 of the screening device. The drive unit and control unit are provided in a standard pre-manufactured shaft housing 11. The first rotor part 7a is connected to one end of the standard device 11 and comprises projections 17, which fit into slots 18 provided on the interior wall of the tubular element 3. By means of the projections 17 and slots 18 the standard device may be slid into the tubular element 3 during assembly of the screening device, the first rotor part 7a being rotationally secured to the tubular element 3. An opposite end of the standard device 11 is connected to the first mounting part 12 in a way, which will be explained below with reference to FIG. 4.

FIG. 4 schematically shows the screening device seen from the end of to tubular element 3, which end is to the right in FIG. 2, the principal design of the first mounting part 12 being shown in more detail. The first mounting part 12 comprises a rod 19, which is transparent in FIG. 4 in order to show a helical spring 21 positioned behind the rod 19. The rod 19 is connected to the shaft device 6 by means of a stub shaft 20. The stub shaft 20 extends coaxially with the axis of rotation R from the shaft device 6 to the rod 19, the rod 19 being fixed to the stub shaft 20 with a longitudinal axis perpendicular to the latter. The rod 19 and stub shaft 20 may be integrally formed. The rod 19 is spring-loaded by means of the helical spring 21, a more concrete design of which is shown in FIG. 3. The helical spring 21 encloses the stub shaft 20. A first end of the helical spring 21 is secured to the stub shaft 20; a second end 22 is secured in a spring retainer 23, the latter forming part of the shaft device 6. The second end 22 is thus positioned in a fixed position in relation to the window.

Rotational movement of the rod 19 about the axis of rotation R is limited by means of a rotation limiter 24 positioned at on end of the rod. In order to strengthen the design, a similar rotation limiter (not shown) may be provided at the opposite end of the rod 19. The shaft device 6 is able to pivot or rotate approximately 8 degrees about the axis of rotation R between two rod abutments 24a, 24b of the rotation limiter 24 in relation to the spring retainer 23 and thus the window. The helical spring 21 is positioned such as to provide a spring force opposite to the direction, in which the bottom bar 4 moves during drawing of the screening body 2, i.e. counter-clockwise in FIG. 4. The rod 19 is thus connected to the helical spring 21 such as to make it pivotable or rotatable in relation to the housing 1.

The characteristic of the helical spring 21 is adjustable by moving the second end 22 of the spring 21 between slots 23a of the spring retainer 23.

In use, the weight of the bottom bar 4 pulls down the screening body 2 such as to provide a rotational force on the tubular member 3 and thus the shaft device 6, said rotational force countering and overcoming the spring force of the helical spring 21. When the bottom bar 4 hangs freely, the rod 19 is thus in the position shown in FIG. 4, i.e. abutting the rod abutment 24b. When the bottom bar 4 and the screening body 2 are lowered by means of the motor 9 and reach the second position, i.e. the bottom of the window, or another obstacle, the spring force overcomes the reduced cumulative weight of the bottom bar 4 and screening body 2. Hereby, the shaft device 6 rotates or pivots such that the rod 19 abuts the other rod abutment 24a of the rotation limiter 24. The motion sensor 15 detects the rotational movement of the shaft device, and control circuitry of the printed circuit board 10 stops the motor 9, thereby preventing that the screening body 2 is lowered further. When rolling up the screening body 2 on the tubular element 3, the bottom bar 4 having reached the tubular element 3 or the housing 1, the motion sensor 15 equivalently sends a signal stopping the motor 9.

The drive unit of the screening device is thus adapted to perform an automatic or semi-automatic movement of the screening body 2 across the windowpane when the motion sensor 15 detects a predefined motion pattern. A user only needs to activate the motor, e.g. by means of a remote control; the screening device stops lowering or elevating the screening body 2 when it reaches one of its extreme positions or an obstacle. Obstacles may take the form of a large gust of wind, ice covering the bottom bar 4 or inside the guide rails 5 or an object. The motion sensor is preferably able to detect direction of motion. Automatic control of the screening body significantly reduces the risk of destroying the screening device during lowering or elevation of the screening body 2.

As mentioned, the motion sensor 15 may be in the form of a gyroscope or gyrosensor, which detects rotational motion of the shaft device 6 by measuring orientation of the sensor itself. Hereby, the printed circuit board 10 may register and memorize the position of the bottom bar 4. This information may be used in many advantageous ways for control of the screening device.

FIGS. 5 to 9 show alternative embodiments of the mounting part 12 in views corresponding to that of FIG. 4. FIG. 10 shows the embodiment of FIG. 9 in a view corresponding to that of FIG. 2. Reference signs in FIGS. 5 to 10 refer to like elements or elements of the same function in the previous figures.

Figure 5:
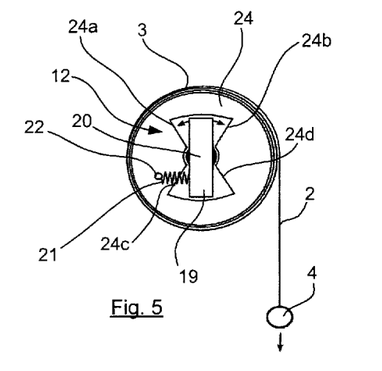
FIG. 5 is an end view corresponding to that of FIG. 4 showing an alternative embodiment.

In the embodiment of FIG. 5 the spring device is in the form of a tension spring 21 connected at an eccentric point of the rod 19. The shaft device 6 is thus spring tensioned in both rotary directions. Also, two lower abutments 24c, 24d of rotation limiter 24 have been provided.

Figure 6:
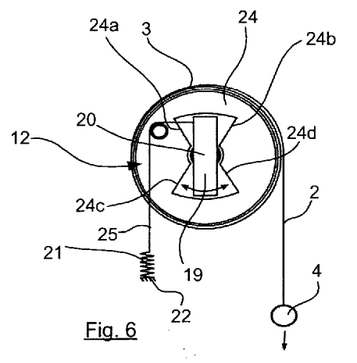
FIG. 6 is an end view corresponding to that of FIG. 4 showing another alternative embodiment.

FIG. 6 is an embodiment equivalent to that of FIG. 5, in which the second end 22 of the tension spring 21 is connected to the housing 1, the window or a building part in arrangement with the window by means of an extension cord 25.

Figure 7:
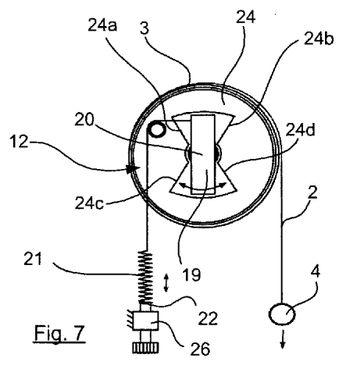
FIG. 7 is an end view corresponding to that of FIG. 4 showing another alternative embodiment.

FIG. 7 is an embodiment equivalent to that of FIG. 6, in which the second end 22 of the tension spring 21 is connected to the housing 1, the window or a building part in arrangement with the window via an adjustment device 26, such as an adjustment bolt. In this embodiment it is possible to adjust the tension of the tension spring 21 by means of the adjustment device 26.

Figure 8:
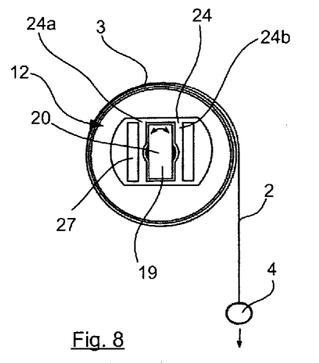
FIG. 8 is an end view corresponding to that of FIG. 4 showing another alternative embodiment.

In the embodiment of FIG. 8 a resilient rotation limiter 24 encloses the rod 19. The rotation limiter 24 provides a spring device by means of cutouts 27 of the resilient material.

Figure 9:
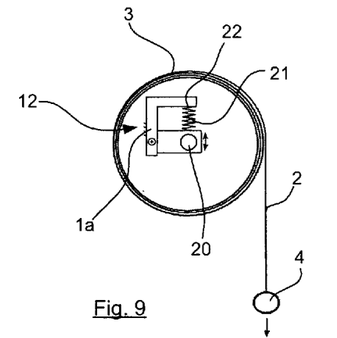
FIG. 9 is an end view corresponding to that of FIG. 4 showing another alternative embodiment.
Figure 10:
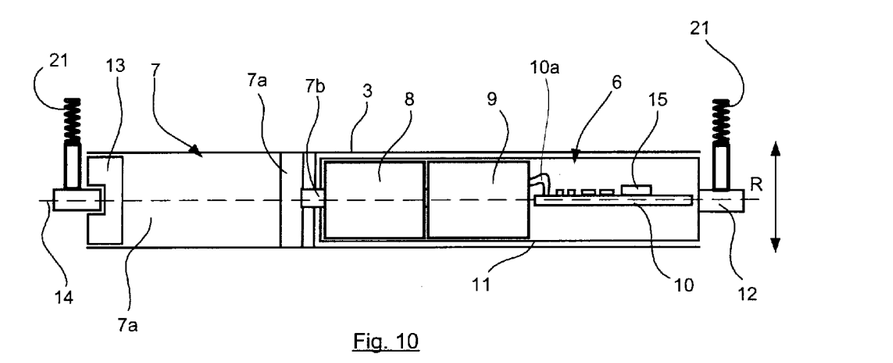
FIG. 10 is a view corresponding to that of FIG. 2 showing the embodiment according to FIG. 9.

The embodiment of FIGS. 9 and 10 is different from the above embodiments of the screening device in that the printed circuit board 10 is located in a fixed position in relation to the axis of rotation R of the tubular element 3, i.e. it does not follow the rotational movement of the tubular element 3, but is positioned at a constant distance from the axis of rotation R. FIG. 9 shows a schematic view illustrating the principal design of the mounting part 12; FIG. 10 shows a more concrete view. In this embodiment the shaft device 6 is identical to the previous embodiment. It is not, however, rotatably embedded in relation to the window. Instead, the entire screening device including the housing 1 and the shaft device 6 is suspended in a spring device comprising two tension springs 21. The screening device is thus able to translate resiliently along the pane of the window when a force is applied to the screening member 3. The electronic motion sensor 15 on the printed circuit board translates along with the remaining part of the screening device and is thus able to detect translational movement of the screening device when the bottom bar 4 reaches an obstacle. The function of this embodiment of the screening device is thus similar to the above embodiments.

Whereas the motion sensor 15 in the above embodiments rotates with the shaft device 6 about an axis of rotation (in the embodiments shown the axis R), in the present embodiment the printed circuit board 10 and thus the motion sensor 15 may be located in an arbitrary position, as long as it is fixed in relation to and thus follows movement of the axis of rotation R of the tubular element 3.

Figure 11:
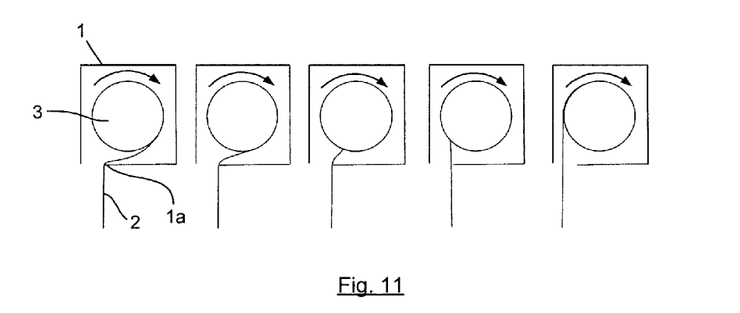
FIG. 11 shows schematic end views of a tubular element of another embodiment of the screening device.

FIG. 11 shows five end views of an embodiment of the screening device according to the invention in different situations. In the first view the tubular element 3 has been positioned inside the housing 1 during assembly of the screening device, the screening body 2 extending out of an opening in the housing 1 at the left side of the housing 1 such as to be completely rolled out. As can be seen, the tubular element 3 has been inserted into the housing 1 such that the upper end of the screening body 2, which is secured to the tubular element 3, is located at the right side of the housing 1, the screening body 2 abutting an edge 1a of the housing 1. If the screening body 2 in this case were rolled up on the tubular element 3 counter-clockwise, it would run against the edge 1a and would eventually be destroyed. In the following four views the screening the tubular element 3 is rotated clockwise as illustrated by the arrow. By means of this method of assembly the screening body 2 is brought to the proper roll-up-position of the last end view such that a proper rolling up of the screening body on the tubular element may be initiated. If the tubular element 3 were reversed before being inserted into the housing 1, the screening body 2 would already be in the situation of the last end view of FIG. 11. With the illustrated embodiment the orientation of the tubular element 3 when inserting it into the housing 1 is thus not important. In both orientations a proper rolling up of the screening body 2 is assured when rotation of the tubular element 3 is commenced.

The screening device according to the present invention may be designed in other ways than the above-mentioned ones.

In all of the above embodiments the drive unit may be secured to the tubular element such as to follow the rotation of this. The rotor may be secured to the building with a mounting part, the drive unit and control unit rotating together with the tubular element. In the embodiment of FIGS. 9 and 10 the control unit may also be secured to the tubular element such as to follow the rotation of this, its ability to detect translational motion of the screening device should, however, preferably be unaffected by the rotation.

The motion sensor may take the form of any other suitable electronic motion sensor, which is able to detect the relevant motion of the shaft device, such as a piezo type motion sensor. The resilience of the spring device may equivalently be achieved by means of for example magnets.

Further, the screening device according to the present invention may be adapted to provide an intuitive activation of the motor, the user pushing the free end of the screening body upwards in order to activate rolling up of the screening body, or pulling it in order to activate drawing of the screening body. In this case the spring should provide a spring force in both directions.

The control logic may be designed to provide a first-use-programming of the control unit. When turning the screening device on for the first time, the screening body moves to both its extreme lower position (the second position) and to its extreme upper position (the first position) in order to record these. In subsequent activation of the screening device the control unit automatically stops the screening body in the extreme positions. This makes it possible to apply a standard sized screening body to windows with different pane dimensions.

The screening device of the present invention may take other forms than an awning blind, such as a curtain, a roller blind or Venetian blinds.

The invention claimed is:

1. A screening device for screening an aperture, such as a window, said screening device comprising
a tubular element with an axis of rotation and rotatable in relation to a shaft device,
a screening body with one end secured to said tubular element and a free opposite end, which on rotation of said tubular element is adapted to move between a first position, in which the screening body is completely rolled up on said tubular element, and a second position, in which the screening body extends over said aperture in order to screen it, and
a drive unit comprising a motor connected to said tubular element and said shaft device such as to provide said rotation of said tubular element in relation to said shaft device, and a control unit controlling operation of said motor,
wherein said control unit comprises a printed circuit board with an electronic motion sensor, said printed circuit board being located in a position in relation to said axis of rotation of said tubular element and/or in relation to said shaft device
wherein a weight element of said screening body is configured to provide a force which overcomes a force provided by a resilient member when said screening body hangs freely, and
wherein the force provided by said resilient member is configured to overcome the force provided by said weight element when the force provided by said weight element is reduced by at least one of an obstacle and a thrust of wind, thereby providing a movement which said electronic motion sensor is configured to detect.

2. A screening device according to claim 1, wherein said drive unit is positioned within said tubular element.

3. A screening device according to claim 1, wherein said drive unit forms part of said shaft device.

4. A screening device according to claim 1 wherein said motion sensor is in the form of an accelerometer or a gyro sensor.

5. A screening device according to claim 1, wherein said motion sensor is adapted to detect direction of motion.

6. A screening device according to claim 1, wherein said drive unit is adapted to perform an automatic or semi-automatic movement of said free end of said screening body between said first and second positions when said motion sensor detects a predefined motion pattern.

7. A screening device according to claim 1, further comprising a mounting part adapted to be secured to said window or a building part in arrangement with said window in a fixed position in relation to said window.

8. A screening device according to claim 7, wherein said shaft device is adapted to perform a limited tilting movement between 3-30° between at least two end points in relation to said mounting part and thus, in use, in relation to said window, said electronic motion sensor in all positions of said free end of said screening body being located in a fixed position in relation to said shaft device.

9. A screening device according to claim 7, wherein said shaft device is resiliently secured to said mounting part.

10. A screening device according to claim 7, wherein a spring device is inserted between said shaft device and said mounting part such as to provide a spring force between them and thereby said resiliency, said spring force acting in a direction opposite to a direction of rotation of said tubular element when moving said free end of said screening body from said first to said second position, preferably a characteristic of said spring device is adjustable.

11. A screening device according to claim 1, wherein when said screening device is mounted on said window, said free end of said screening body being adapted to move from said first to said second position substantially parallel to a plane of a pane of said window.

12. A screening device according to claim 1, wherein said motion sensor is configured to detect its own motion.

13. A screening device according to claim 1, wherein said resilient member is a spring.

14. A screening device according to claim 1, wherein said resilient member is a helical spring.

15. A screening device according to claim 1, wherein said printed circuit board is located in a fixed position in relation to said axis of rotation of said tubular element and/or in relation to said shaft device.

16. A screening device according to claim 1, wherein said screening body is an awning cloth.

* * * * *